United States Patent
Zhang et al.

(10) Patent No.: US 8,206,766 B2
(45) Date of Patent: Jun. 26, 2012

(54) METHOD FOR USING BAMBOO LEAF EXTRACT AS ACRYLAMIDE INHIBITOR FOR HEAT PROCESSING FOOD

(76) Inventors: Ying Zhang, Hangzhou (CN); Xiaoqin Wu, Hangzhou (CN); Yu Zhang, Hangzhou (CN); Genyi Zhang, Hangzhou (CN); Dingding Luo, Hangzhou (CN); Yi Dong, Hangzhou (CN)

( * ) Notice: Subject to any disclaimer, the term of this patent is extended or adjusted under 35 U.S.C. 154(b) by 644 days.

(21) Appl. No.: 11/909,265

(22) PCT Filed: Mar. 20, 2006

(86) PCT No.: PCT/CN2006/000431
§ 371 (c)(1),
(2), (4) Date: Jul. 23, 2009

(87) PCT Pub. No.: WO2006/099798
PCT Pub. Date: Sep. 28, 2006

(65) Prior Publication Data
US 2009/0304879 A1    Dec. 10, 2009

(51) Int. Cl.
*A23L 3/34*    (2006.01)

(52) U.S. Cl. ........ 426/242; 426/310; 426/321; 426/332; 426/654

(58) Field of Classification Search .................. 426/242, 426/310, 321, 332, 654
See application file for complete search history.

(56) References Cited

U.S. PATENT DOCUMENTS

| 5,532,043 | A  | * | 7/1996 | Terashi et al. | ............... | 428/152 |
| 6,528,062 | B1 | * | 3/2003 | Kim | ........................ | 424/195.16 |

FOREIGN PATENT DOCUMENTS

JP    2004-215559    *    8/2004

OTHER PUBLICATIONS

Hu et al. Journal of Agric. Food Chemistry. 2000. vol. 48. pp. 3170-3176.*
English Translation for JP 2004-215559 published Aug. 2004.*

* cited by examiner

*Primary Examiner* — Anthony Weier
(74) *Attorney, Agent, or Firm* — Yuan Qing Jiang

(57) ABSTRACT

A method for using a bamboo leaf extract as an acrylamide inhibitor for heat processing food, includes adding to the bamboo leaf extract at least one selected from a group consisting of ginkgo extract, tea extract, rosemary extract, apple polyphenol extract, haw extract, onion extract, licorice extract, root of kudzuvine extract, grape seed extract and leech extract; and preparing a composition, in which the bamboo leaf extract takes up 34-95% of the total weight of the composition. The bamboo leaf extract used as the acrylamide inhibitor in food systems has an inhibiting rate to acrylamide formation of up to 15-98%.

11 Claims, 4 Drawing Sheets

METHOD FOR USING BAMBOO LEAF EXTRACT AS ACRYLAMIDE INHIBITOR FOR HEAT PROCESSING FOOD

TECHNICAL FIELD OF THE INVENTION

This invention generally relates to the safety field of heat processing food and especially the use of a bamboo leaf extract, comprising flavonoids and phenolic acids as main chemical components, as an acrylamide inhibitor for heat processing food.

BACKGROUND OF THE INVENTION

Food safety issue is greatly related to the national economy and the people's livelihood. To solve the food safety issue, some potential food hazards including physical hazard, chemical hazard and microbial hazard should be greatly taken into consideration. The physical hazard can easily be monitored and prevented and the microbial hazard can be controlled during food processing. Besides, the chemical hazard such as pesticide residue and veterinary drug residue can be generally controlled by tracking back to the original source because these harmful residues are artificially added during the growth period of food materials. However, the most troublesome problem is caused by some chemical hazardous compounds (e.g. acrylamide), which are not generated from exotic environment but spontaneously from Swedish National Food formed during food processing.

In April 2002, Swedish scientist Margareta Törnqvist from Stockholm University firstly found the neurotoxin and potential carcinogen, i.e. acrylamide, in fried or baked potato and cereal-based food [Tareke, E. et al. Analysis of acrylamide, a carcinogen formed in heated foodstuffs. *J. Agric. Food Chem.*, 2002, 50: 4998-5006]. This publication indicated that acrylamide found in high-temperature heated (>120° C.) carbohydrate-rich food greatly exceeds the safety standard and probably induces cancer, which led to wide scare at that time. Meanwhile, scientists Administration (SNFA) analyzed over 100 kinds of food under randomization and reported corresponding results in its official website. In May 2002, British Food Standards Agency (BFSA) reported similar results. Subsequently, government organizations taking charge of food safety from other countries including Norway, USA, Australia, New Zealand and Canada also reported the acrylamide content in various food. Thus, the finding from Swedish scientists was widely confirmed. Meanwhile, many international organizations and research institutes commenced studies into the formation mechanism, toxicology and risk assessment of acrylamide in food. In March 2005, the Food and Agriculture Organization (FAO) and the World Health Organization (WHO) Joint Expert Committee announced in Geneva that certain food that contain the carcinogenic toxin acrylamide can greatly harm people's health and especially some western-style snacks contain a considerable amount of acrylamide. Acrylamide is an acknowledged neurotoxin and carcinogen [JIFSAN/NCFST Workshop "Acrylamide in food, scientific issues, uncertainties, and research strategies," 28-30 Oct. 2002. Rosemont, USA]. Results of animal test showed that a long-term exposure of acrylamide may not only induce pathological change of nervous system but also lead to various carcinogenesis. Further study indicated that this chemical contaminant is not present in food materials but formed during food processing [Mottram, D. S., et al. Acrylamide is formed in the Maillard reaction. *Nature*, 2002, 419: 448-449; Stadler, R. H., et al. Acrylamide from Maillard reaction products. *Nature*, 2002, 419: 449-450].

Acrylamide, a white crystalline solid, can be dissolved in water, ethanol, methanol, dimethyl ether or acetone, but cannot be dissolved in non-polar solvents such as heptane and benzene. The $\alpha,\beta$-unsaturated amino system of acrylamide is very easy to react with nucleophilic groups such as the hydrosulfide group of cysteine via Michael addition, which induces pathological changes via affecting normal functions of protein.

Governments in many countries have restrictive standards for the acrylamide content. For instance, the acrylamide content in drinking water should not exceed 0.5 μg/L. According to this standard, the acrylamide content in each kilogram of French fries should be less than 0.5 μg. However, the average content of acrylamide in French fries is actually about 1480 μg/g, which is 2690 times as the content in normal safety standard. Meanwhile, the acrylamide content in other heat-treated food such bakery bread and cookies also greatly exceeds the safety standard. In China, there are also some popular food which are made by similar heat processing methods compared to western-style snacks (heating temperature $\geq 120°$ C.). These popular foods include Chinese traditional breakfast food (e.g. fried bread sticks and clay oven rolls), imported snacks (e.g. fried snack noodles and cereal breakfast), drinks (e.g. coffee and cocoa) and non-staple foodstuffs (e.g. tobaccos and cigarettes). Unfortunately, few researches have focused on the analysis, control and risk assessment of acrylamide in China since acrylamide was found in heat-treated food in 2002.

Mechanism study on the formation of acrylamide demonstrated that acrylamide is generated from the Maillard reaction of free asparagine, and this mechanism is widely acknowledged now. Maillard reaction is a series of complicated chemical reactions between reducing sugars and the free amino groups of amino acids or proteins. It is also one of important pathways contributing to the flavor generation during heat processing. There are three main reaction stages in the Maillard reaction: (i) Schiff base with a "C=N" bond is formed by the reaction between the carbonyl of reducing sugar and the amino group of amino acid, and subsequently the Amadori or Heyns product is formed by the rearrangement of Schiff base. (ii) Flavor compounds and intermediates are generated from the Amadori or Heyns product via different degradation pathways. (iii) Brown products of Mailard reaction are finally formed.

The formation mechanism of acrylamide regarding the participation of asparagine in the Maillard reaction is called "asparagine pathway". The beginning of asparagine pathway is the initial stage of Maillard reaction. There are two different reaction pathways that can both induce the formation of acrylamide when the Schiff base intermediate which is in dynamic balance with N-glycosyl amino acid is generated: (i) Strecker pathway, in which the Amadori product is formed via the Amadori rearrangement of Schiff base, carbonyl-containing products are subsequently formed via dehydration and deamination, acrylamide is finally formed via the Strecker degradation of asparagine and dehydration & deamination in the presence of carbonyl-containing products; (ii) N-glycoside pathway, in which oxazolidone is initially formed via undergoing the intramolecular cyclization of Schiff base, the decarboxylated Amadori product is subsequently formed and, acrylamide is finally generated via fragmentation of the "C—N" bond of decarboxylated Amadori product [Zhang, G. Y. Formation mechanism and risk assessments of acrylamide generated in heated foodstuffs. *J. Wuxi Univ. Light Ind.*, 2003, 22(4): 91-99]. Yaylayan et al. and Becalski et al. (2003) further confirmed asparagine is a key precursor contributing to the formation of acrylamide [Yaylayan, V. A., et al. Why asparagine needs carbohydrates to generate acrylamide. *J. Agric. Food Chem.,* 2003, 51: 1753-1757; Becalski, A., et al. Acrylamide in food: occurrence, sources, and modeling. *J. Agric. Food Chem.,* 2003, 51: 802-808]. Elmore et al. (2003) also demonstrated the formation mechanism and precursors of acrylamide in potato, wheat and rye models [Elmore, J. S., et al. Measurement of acrylamide and its precursors in potato, wheat and rye model systems. *J. Agric. Food Chem.,* 2003, 51: 4782-4787].

Based on the above mechanism, the formation of acrylamide during heat processing would have been reduced if the free asparagine in original food materials had been removed or the Maillard reaction had been inhibited. Current studies indicate that there are two ways for reduction or inhibition of the acrylamide formation during heat processing, i.e. (i) modification of heat processing conditions (e.g. heat processing styles, heating temperature and heating time) and (ii) modification of processing attributes of food materials. First, the formation of acrylamide is affected by the heat processing temperature, time and styles. Therefore, acrylamide can be reduced or inhibited by the control of these important heat processing conditions. For instance, (i) acrylamide can be reduced by a water-cooking method through the control of heating temperature (45-78° C.) and heating time (>4 min) [Lindsay, R. C. & Jang, S. Method for suppressing acrylamide formation. US patent, US2004/0224066 A1]. Acrylamide can be reduced by the control of frying and heating processes such as peeling, washing, par-frying and oil leaching [Barry, D. L. et al. Method for reducing acrylamide formation in heat processing food. PCT patent, WO2004/075656 A2], the mechanism of which is the inhibition of the lipid-glycerol-acrolein-acrylic acid-acrylamide pathway via the reduction of lipid pyrolysis degree [Tricoit, J. et al. Method for preventing acrylamide formation during heat treatment of food. US patent, US2004/0115321 A1; Tricoit, J. et al. Method for preventing acrylamide formation during heat-treatment of food. EU patent, 03292813.7]. Second, acrylamide can be reduced or inhibited by modifying or controlling processing attributes of food materials and adding other components. For instance, (i) acrylamide is greatly reduced by the addition of divalent or trivalent metal cations, which can come from food containing calcium, magnesium, copper, aluminum and iron salts [Elder, V. A. et al. Method for reducing acrylamide formation in heat processing food. PCT patent, WO 2004/075657 A2; Elder, V. A. et al. Method for reducing acrylamide formation in heat processing food. US patent, US 2004/0085045 A1]. (ii) Acrylamide can be reduced by a simple treatment with a pH-lowering agent, in which a nucleophilic amino group (—$NH_2$) is protonated and converted into a non-nucleophilic amine (—$NH_3^+$) [Baardseth, P. et al. Reduction of acrylamide formation. PCT patent, WO 2004/028278 A2; Jung, M. Y. et al. Method for the reduction of acrylamide formation. PCT patent, WO 2004/060078 A1; Jung, M. Y. et al. A novel technique for limitation of acrylamide formation in fried and baked corn chips and in French fries. *J. Food Sci.,* 2003, 68: 1287-1290]. (iii) Acrylamide can be reduced by the decrease of precursors thereof in food materials (including the use of microorganisms to metabolize sugars or the addition of asparaginase to convert asparagine into aspartic acid) [Awad, A. C. Reduction of acrylamide formation in cooked starchy food. US patent, US 2004/0086597 A1; Elder, V. A. et al. Method for reducing acrylamide formation in heat processing food. PCT patent, WO 2004/026042 A1]. (iv) Acrylamide can be reduced by the addition of at least one amino acids selected from the group consisting of cysteine, lysine, glycine, histidine, alanine, methionine, glutamic acid, aspartic acid, proline, phenylalanine, valine and arginine. These amino acids can also react with sugars and simultaneously inhibit the reaction between asparagine and reducing sugars because of the competitive inhibition principle [Elder, V. A. et al. Method for reducing acrylamide formation in heat processing food. PCT patent, WO 2004/075655 A2]. Although all of the above approaches may theoretically inhibit the generation of acrylamide, they are difficult to be applied in actual food processing when method practicability, organoleptic request of food and edible safety are taken into consideration. Therefore, it is still necessary to search novel approaches, which not only effectively reduce the acrylamide content, but also remain original flavor and texture of food. Recently, Chinese researchers used the $Ca^{2+}$ and ferulic acid spiked asparagine-glucose simulated system to investigate the reduction of acrylamide. Results demonstrated that more than 80% of acrylamide was reduced within the optimal addition level of $Ca^{2+}$ and ferulic acid and optimal reaction temperature and time [Ou, S. Y., et al. Acrylamide inhibitor used for heat processing food and its technical application method. CN patent, CN 1561866A]. However, there are significant differences of reduction effect between actual food system and simulated system. Therefore, this novel technique needs to be further investigated in actual food systems. Meanwhile, the variation of acrylamide content from "asparagine pathway" with the change of heat processing conditions should also be further investigated.

A PCT patent application filed by researchers from Food Technology Institute of Finland Helsinki University and published in 2004 discloses that addition of flavonoids could effectively reduce the acrylamide content in French fries. In their study, a flavonoid-enriched plant extract (0.05%-0.15%), consisting of green tea extract (45%), apple juice concentrate (45%) and onion juice concentrate (10%), was added during the frying process. Results indicated that about 50% of acrylamide was reduced during actual frying process of French fries [Kurppa, L. A process and composition for prevention of reducing the formation of acrylamide in food. PCT patent, WO 2004/032647 A1].

Flavonoids, a class of important functional factors in food, are widely present in medicinal herbs, vegetables and fruits. Flavonoids have great bio-antioxidant activity and strong protection effect against cardio-cerebral vascular diseases, cancer and diabetes. Currently, addition of plant flavonoids may be an appropriate method for the reduction of acrylamide formation in food because this method can ensure both food safety and food functionality simultaneously.

Many kinds of flavonoid-rich plant extracts such as tea extract, liquorice extract and rosemary extract are widely used for food antioxidants all over the world. The present inventors have recently developed a bamboo leaf extract, which is also called "antioxidant of bamboo leaves" (AOB). AOB has already been approved as a novel food antioxidant and listed in China Hygienic Standard for the Use of Food Additives (GB-2760) issued by China Ministry of Health in April 2004. As described above, AOB is a natural phenolic part extracted from bamboo leaves and includes flavonoids and phenolic acids as its major components. In detail, there are four bamboo-leaf C-glycosyl flavones (i.e. orientin, homoorientin, vitexin and isovitexin) and three phenolic acids (i.e. chlorogenic acid, ferulic acid and caffeic acid) in AOB [Zhang, Y., et al. Antioxidant of bamboo leaves and its applications. CN patent, CN 1528197A]. Their chemical structures are shown as follows:

(i)
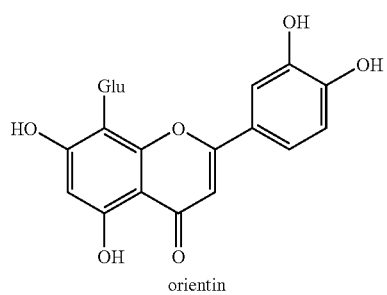
orientin (ii)
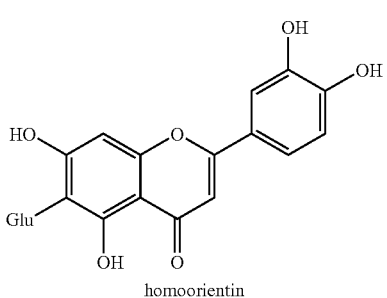
homoorientin (iii)
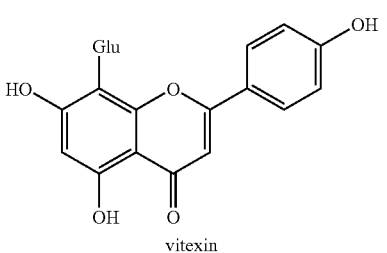
vitexin (iv)
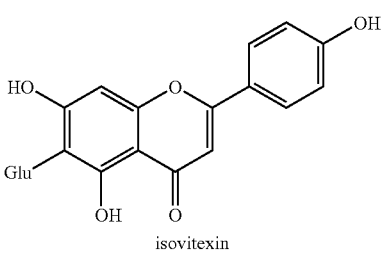
isovitexin (v)
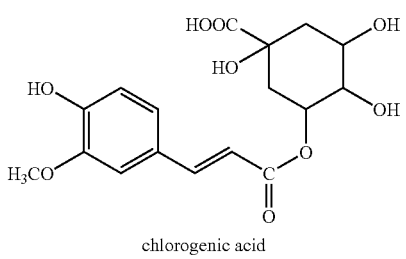
chlorogenic acid (vi)
caffeic acid (vii)
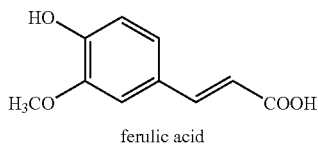
ferulic acid The structural characteristic of bamboo-leaf C-glycosyl flavones is the C—C bond linkage between the flavone parent nucleus and glucosyl at $C_6$ or $C_8$ position in the flavone molecular. The C-glycosyl flavones have extremely stability because of their strong C—C bond energy. Furthermore, they cannot be hydrolyzed by acid, heat and enzyme. Their good hydrophilicity is in favor of the application in various food systems. Under such consideration, C-glycosyl flavones are much superior to O-glycosyl flavones, especially suitable for the use in heat processing food. Although studies on flavonoids started over 100 years ago, most of researches focused on flavone aglycones (e.g. quercetin) and O-glycosyl flavones (e.g. rutin). Studies on the structure and functionality of C-glycosyl flavones initiated since 1990s. Hitherto, studies on the effect of C-glycosyl flavones on the reduction of acrylamide in heat processing food have not ever been reported.

Considering the unique background of bamboo leaves (dual use of drugs and food) and their outstanding functionality, AOB will have a very bright application prospect in food industry.

SUMMARY OF THE INVENTION

The purpose of this invention is to provide a new use of the bamboo leaf extract, i.e., a use of the bamboo leaf extract as an acrylamide inhibitor for heat processing food.

In the first aspect, the invention provides a use of the bamboo leaf extract as an acrylamide inhibitor for heat processing food.

In a preferred embodiment, the inhibitor contains 1-99% by weight of bamboo leaf extract (preferably 34-95% by weight).

In another preferred embodiment, the acrylamide inhibitor also contains at least one selected from a group consisting of ginkgo extract, tea extract, rosemary extract, apple polyphenol extract, haw extract, onion extract, licorice extract, root of kudzuvine extract, grape seed extract and leech extract.

In another preferred embodiment, the acrylamide inhibitor comprises 34-95% by weight of the bamboo leaf extract and 5-66% by weight of other natural extracts, such as plant and animal extracts.

In another preferred embodiment, the bamboo leaf extract is the aqueous or ethanol extract of bamboo leaves. More preferred, the total flavonoid content of the bamboo leaf extract is 4%-50% determined by the $Al(NO_3)_3$—$NaNO_2$ colorimetry using rutin as the calibration standard and the total phenolic acid content is 10%-80% determined by the Folin-phenol reagent reducing colorimetry using p-hydroxybenzoic acid as the calibration standard.

In the second aspect, the invention provides a heat processing method, comprising the steps of:
(a) mixing the food to be processed with the acrylamide inhibitor, thereby forming the food containing the acrylamide inhibitor, wherein the acrylamide inhibitor contains the bamboo leaf extract;
(b) processing the food mixed with the acrylamide inhibitor at a temperature of $\geqq 120°$ C., thereby forming a heat processing food.

In a preferred embodiment, the acrylamide inhibitor also contains at least one selected from a group consisting of ginkgo extract, tea extract, rosemary extract, apple polyphenol extract, haw extract, onion extract, licorice extract, root of kudzuvine extract, grape seed extract and leech extract.

In another preferred embodiment, the food to be processed contains French fries, potato crisps, crisp cookies, biscuits, cakes, bread, cereal breakfast, fried bread sticks, clay oven rolls, snack noodles, hamburger, fried chickens, coffee, cocoa, tobaccos or cigarettes, which is heat processed by frying, baking, grilling, roasting, microwave heating, puffing or burning.

In another preferred embodiment, each kilogram of food to be processed is mixed with 0.001-5 g of the acrylamide inhibitor in Step (a).

In another preferred embodiment, each kilogram of food to be processed is mixed with 0.01-2 g of the acrylamide inhibitor in Step (a).

In another preferred embodiment, each kilogram of food to be processed is mixed with 0.1-1 g of the acrylamide inhibitor in Step (a).

In another preferred embodiment, the mixing procedure is performed via coating, soaking or spraying in Step (a).

In another preferred embodiment, a mixed coating material is prepared by mixing the original coating material with the acrylamide inhibitor, then the food to be processed is homogeneously covered by the mixed coating material.

In another preferred embodiment, each kilogram of the original coating material is mixed with 0.001-5 g of the acrylamide inhibitor.

In another preferred embodiment, each kilogram of the original coating material is mixed with 0.1-1 g of the acrylamide inhibitor.

In another preferred embodiment, a soaking solution is prepared by adding the acrylamide inhibitor into an aqueous solution or dilute ethanol solution, then the food to be processed is soaked by the soaking solution.

In another preferred embodiment, the soaking solution is prepared by adding 0.001-5 g of the acrylamide inhibitor into each kilogram of aqueous solution or dilute ethanol solution.

In another preferred embodiment, the soaking solution is prepared by adding 0.1-1 g of the acrylamide inhibitor into each kilogram of aqueous solution or dilute ethanol solution.

In another preferred embodiment, a spraying solution is prepared by adding the acrylamide inhibitor into aqueous solution or dilute ethanol solution, then the surface of the food to be processed is sprayed by the spraying solution.

In another preferred embodiment, the spraying solution is prepared by adding 0.001-5 g of the acrylamide inhibitor into each kilogram of aqueous solution or dilute ethanol solution.

In another preferred embodiment, the spraying solution is prepared by adding 0.1-1 g of the acrylamide inhibitor into each kilogram of aqueous solution or dilute ethanol solution.

In the third aspect, the invention provides an acrylamide inhibitor composition for use in heat processing food comprising 1%-99% by weight of the bamboo leaf extract and 1%-99% by weight of at least one selected from a group consisting of ginkgo extract, tea extract, rosemary extract, apply polyphenol extract, haw extract, onion extract, licorice extract, root of kudzuvine extract, grape seed extract and leech extract.

The acrylamide inhibitor provided in the invention can effectively inhibit the formation of acrylamide in heat processing food.

DETAILED DESCRIPTION

Figure 1:
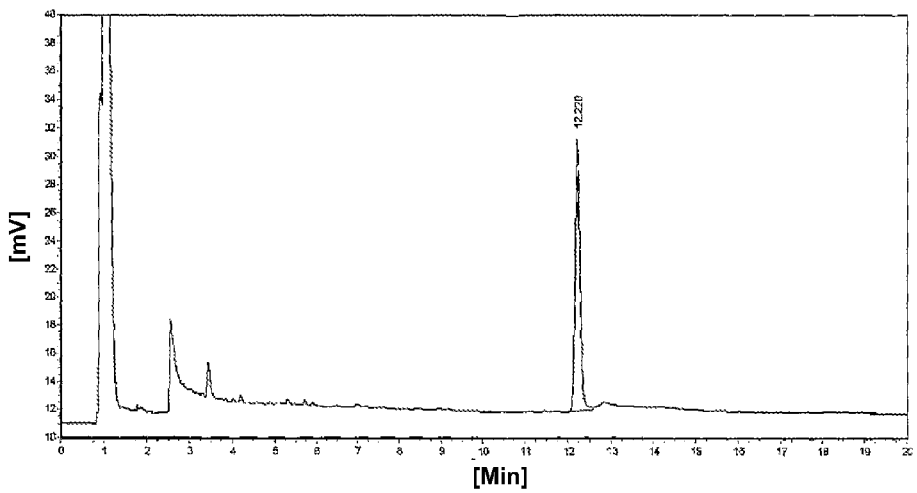
FIG. 1 shows the gas chromatogram of acrylamide standard.

After a wide and extensive research, the applicants has found that a composition comprising the bamboo leaf extract can effectively inhibit the formation of acrylamide toxin in heat processing food. Besides, the above-mentioned acrylamide inhibitor composition can include other extracts such as ginkgo extract and tea extract. The acrylamide inhibitor of this invention can be covered, soaked or sprayed onto food materials during heat processing.

As described herein, the bamboo leaf extract, the acrylamide inhibitor including the bamboo leaf extract and the composition including the bamboo leaf extract can be all used for the acrylamide inhibitor during the preparation of heat processing food. The acrylamide inhibitor including the bamboo leaf extract can be exchanged with the composition including the bamboo leaf extract. This composition contains the bamboo leaf extract and at least one selected from a group consisting of ginkgo extract, tea extract, rosemary extract, apply polyphenol extract, haw extract, onion extract, licorice extract, root of kudzuvine extract, grape seed extract and leech extract.

The bamboo leaf extract of this invention is a natural extract from the leaves of *Phyllostachys Sieb*. Et Zucc. from Bambusoideae family in Gramineae. The production technology of bamboo leaf extract was disclosed in two patents for inventions previously filed by applicants (CN patent No. ZL 98104563.4 and ZL 98104564.2). It shall be declared that the bamboo leaf extract described in this invention is not only the product obtained via the above-mentioned technology, but also the refined product (including the antioxidant of bamboo leaves) further processed via some advanced technologies such as adsorption-desorption and membrane separation.

The appearance of the bamboo leaf extract is a kind of yellow or brown powder, or presented as an extractum. The main components of the bamboo leaf extract include flavonoids (i.e. homoorientin, orientin, isovitexin and vitexin) and phenolic acids (i.e. chlorogenic acid, ferulic acid and caffeic acid). The total flavonoid content of the bamboo leaf extract is 4%-50% determined by the $Al(NO_3)_3$—$NaNO_2$ colorimetry using rutin as the calibration standard and the total phenolic acid content is 10%-80% determined by the Folin-phenol reagent reducing colorimetry using p-hydroxybenzoic acid as the calibration standard.

Acrylamide is generated via an equimolar reaction between asparagine and glucose with a heating time of 10-40 min at high heating temperature ($\geq 120°$ C.) in the simulated reaction system, which can be an aqueous solution or a low moisture composite. Then, the acrylamide content is determined. Meanwhile, the above mentioned reaction system is considered as a blank control. The acrylamide inhibitor containing the bamboo leaf extract is added thereto in the claimed addition range and the acrylamide yield is determined by the same heat condition. The inhibition effect of the acrylamide inhibitor is calculated compared to the control. The acrylamide content is determined by gas chromatography (GC) or liquid chromatography tandem mass spectrometry (LC-MS/MS).

Acrylamide is also generated in an actual reaction system of heat processing food material. The formation of acrylamide can be reduced by adding the acrylamide inhibitor containing the bamboo leaf extract directly into food materials or coating materials proportionally. The acrylamide inhibitor can then affect the asparagine pathway and block the reaction chain of acrylamide formation during heat processing. Alternatively, the formation of acrylamide can be reduced by adding the acrylamide inhibitor including the bamboo leaf extract into aqueous solution or dilute ethanol solution proportionally, and the food materials are soaked in the solution or the solution is homogeneously sprayed on the surface of food materials. Meanwhile, an actual heat processing system without addition of acrylamide inhibitor including the bamboo leaf extract is considered as a control. The acrylamide inhibitor including the bamboo leaf extract is added thereto in a claimed amount and the acrylamide yield is determined by the same heat condition. The inhibition effect of the acrylamide inhibitor is calculated compared to the control. The acrylamide content is determined by GC or LC-MS/MS.

1. The experimental conditions of GC analysis are shown as follows:
   Instrumental name: Fuli GC9790 gas chromatograph;
   Detector: electronic capture detector (ECD);
   Chromatographic column: HP-5 (30 m×0.32 mm, 25 am);
   Injector: SLIP (Split less sampling);
   Mobile phase & flow rate: nitrogen gas (1 ml/min);
   Injection volume: 1 µl;
   Initial temperature of oven: 100° C.;
   Detector interface temperature: 250° C.;
   Injector interface temperature: 250° C.;
   Temperature programming: 100° C. (1 min)→at 10° C./min to 140° C. (15 min)→at 30° C./min to 240° C. (7 min).

Meanwhile, samples should be pretreated by derivatization before GC analysis in order to improve the volatilization degree. The bromine molecules are first produced by the oxidation-reduction reaction between potassium bromide and potassium bromate and then reacted with acrylamide to produce bromopropenamide or dibromopropenamide. Finally, the derivatization reaction is terminated by the addition of sodium thiosulfate in order to reduce excess bromine to bromine anion.

The gas chromatogram of acrylamide standard is shown in FIG. 1.

2. The experimental conditions of LC-MS/MS analysis are shown as follows:
   Instrumental name: LC-MS/MS commercially available from Micromass Co.
   LC Conditions:
   Chromatographic column: Atlantis (2.1×150 mm, 5 µm);
   Mobile phase: methanol (0.1% of formic acid)/water (0.1% of formic acid)=2/98;
   Flow rate: 0.2 mL/min;
   Column temperature: 20° C.;
   Injection volume: 10 µL.
   MS Conditions:
   Capillary voltage: 3.50 kV;
   Cone voltage: 50 V;
   Source temperature: 100° C.;
   Desolvation temperature: 350° C.;
   Flow rate of cone gas: 45 L/h;
   Flow rate of desolvation gas: 400 L/h;
   MRM parameters: acrylamide (72>55), $^{13}C_3$-acrylamide (75>58);
   Collision energy: 6 eV.

Figure 8:
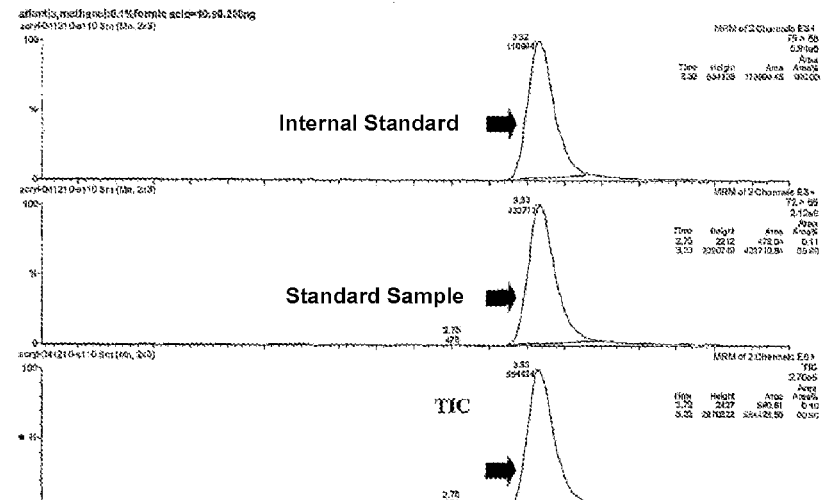
FIG. 8 shows the LC-MS/MS chromatogram of acrylamide and $^{13}C$-labeled acrylamide standard.

The LC-MS/MS chromatogram of acrylamide and $^{13}C_3$-acrylamide standards is shown in FIG. 8.

The advantages of this invention are presented as follows:
1. Exogenous phytochemicals including flavonoids and phenolic acids are used to process food materials within the above mentioned concentration ranges and effectively reduce the formation of acrylamide during heat processing. Meanwhile, they do not negatively affect the sensory attributes of final products such as color, fragrance, flavor, shape and texture, which can be easily accepted by consumers.
2. When natural antioxidants including plant flavonoids and phenolic acids are used as acrylamide inhibitors and added into food, they can not only ensure the food safety, but also fortify nutrition and prolong preservation duration.
3. The source of materials is extensive and the cost is low.

Now this invention is clarified in detail with reference to the following examples. It should be understand that these examples are intended to purely exemplary and are not intended to limit the scope of the present invention. The following experimental methods in which no specific conditions are described, are usually conducted under routine conditions, or in accordance with the manufacturer's recommended conditions. Unless indicated otherwise, all parts and the percentages are calculated on a weight basis.

Example 1

The Inhibition Effect of Bamboo-Leaf-Extract on Acrylamide in Simulated Reaction System 10 mL L-Asparagine (0.1 mol/L) and 10 mL D-glucose (0.1 mol/L) were put into a 100 mL bottle and mixed. The mixture was used as a blank control group. To the blank control group the bamboo-leaf-extract was added to afford two test groups containing 10 mg/kg bamboo-leaf-extract (test group 1) and 150 mg/kg bamboo-leaf-extract (test group 2), respectively. The blank control group, test groups 1 and 2 were heated in a 120° C. water bath respectively for 15 min. The resulting reaction solution was derivatized and then analyzed by GC.

The specific derivatization process was conducted as follows:

20 μL sample of each of the blank control group, test groups 1 and 2 was added into three 20 mL colorimetric tubes respectively, followed by 0.6 mL 10% (v/v) $H_2SO_4$ and water up to 10 mL. The tubes were precooled in 4° C. refrigerator for 20 min and 1.5 g KBr powder was then dissolved in each of the groups. 1 mL of 0.1 mol/L $KBrO_3$ was added thereto and mixed completely. Each of the groups was allowed to stand in refrigerator for 30 minutes. After taking out 0.1 mL 1 mol/L $Na_2S_2O_3$ was added into each of the groups and mixed completely. 5 mL of HPLC-grade or redistilled ethyl acetate was added to each of the groups and extracted completely. The ethyl acetate phase was separated and dried over $Na_2SO_4$.

The bamboo-leaf-extract used herein was the antioxidant from bamboo leaves (AOB) as a food additive commercially available from Zhejiang University (Hangzhou) Leaf Bio-Technology Co., Ltd. The bamboo-leaf-extract had an appearance of brown-yellow powder, and contained 32.5% total flavonoids and 56.7% total phenol. There were four C-glycosides flavonoids: homoorientin, orientin, isovitexin and vitexin in a content ratio determined by HPLC of 2.75: 1.05:1.15:1 [Yu Zhang et al., Determination of flavone C-glucosides in antioxidant of bamboo leaves (AOB) fortified foods by reversed-phase high-performance liquid chromatography with ultraviolet diode array detection, Journal of Chromatography A, 2005, 1065: 177-185].

Figure 2:
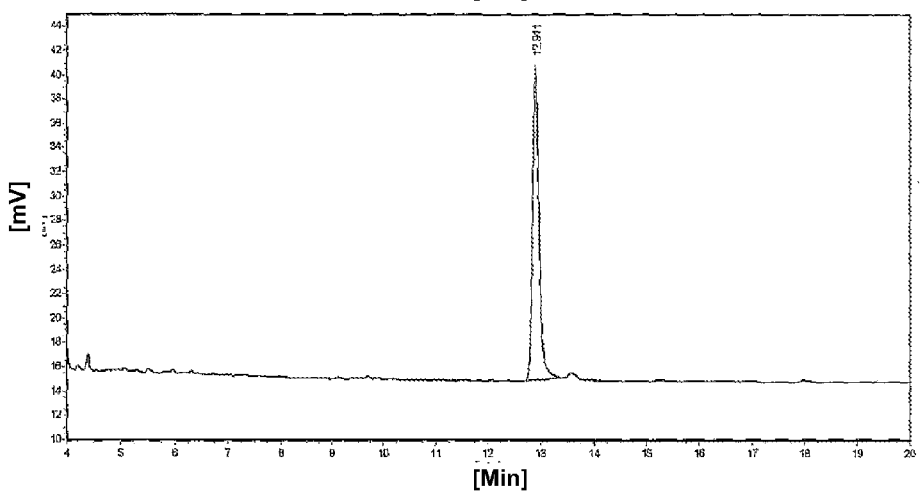
FIG. 2 shows the gas chromatogram of acrylamide generated via "asparagine pathway" in the control group.
Figure 3:
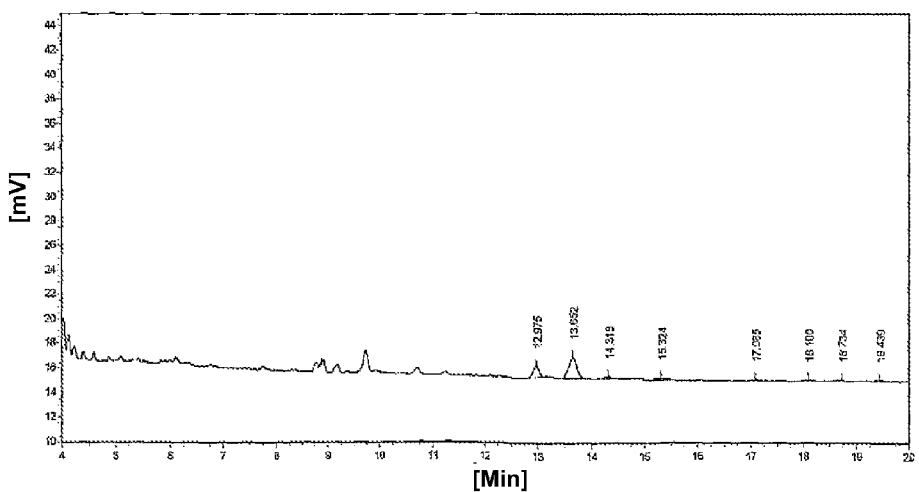
FIG. 3 shows the gas chromatogram of acrylamide generated via "asparagine pathway" with addition of 10 mg/kg of the bamboo leaf extract in the experimental Group 1.
Figure 4:
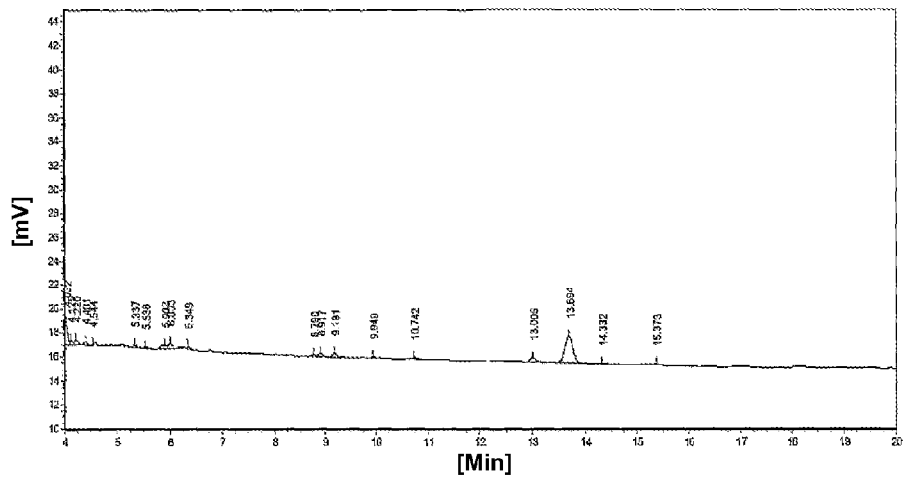
FIG. 4 shows the gas chromatogram of acrylamide generated via "asparagine pathway" with addition of 150 mg/kg of the bamboo leaf extract in the experimental Group 2.

FIG. 2 is the gas chromatogram of acrylamide generated in the blank control group via Asparagine pathways; FIG. 3 is the gas chromatogram of acrylamide generated in test group 1 (10 mg/kg AOB); and FIG. 4 is the gas chromatogram of acrylamide generated in test group 2 (150 mg/kg AOB). It was determined by calculating the peak areas that 6460.31 μg/kg 410.10 μg/kg and 190.66 μg/kg were formed and the acrylamide inhibition rates of AOB in the simulated reaction systems were 93.6% and 97.0%, respectively (as shown in table 1).

TABLE 1

The inhibition effect of AOB on acrylamine formed in simulated reaction systems (n = 6)

| Groups | AOB dose (mg/kg) | Acrylamide content (μg/kg) | Inhibition rate (%) |
|---|---|---|---|
| Blank control | 0 | 6460.31 ± 570.24 | — |
| Test group 1 | 10 | 410.10 ± 10.45 | 93.6 ± 0.4 |
| Test group 2 | 150 | 190.66 ± 11.74 | 97.0 ± 0.3 |

The results showed that AOB exhibits a very significant inhibition effect on acrylamide formation in the stimulated reaction systems.

Example 2

The Dose-Dependent Inhibition of Bamboo-Leaf-Extract to Acrylamide Formed in Above Simulated Reaction Systems In order to investigate the optimum dose range of AOB to inhibit acrylamide formation in heat-processing foods, four AOB dose levels were set up in the simulated systems. The AOB sample used herein was the same as in example 1 and the procedure was also similar to example 1. The results were listed in table 2. The content of acrylamide was determined by GC.

TABLE 2

The dose-dependent inhibition rate of AOB to acrylamine formed in simulated reaction systems (n = 6)

| groups | AOB dose (mg/kg) | Acrylamide content (μg/kg) | Inhibition rate (%) |
|---|---|---|---|
| Blank control | 0 | 5977.19 ± 425.43 | 0 |
| Test group | 0.001 | 4870.30 ± 221.28 | 18.5 ± 3.1 |
|  | 0.003 | 3884.90 ± 185.40 | 35.0 ± 2.9 |
|  | 0.007 | 1735.46 ± 76.55 | 71.0 ± 4.8 |
|  | 0.009 | 544.95 ± 33.70 | 90.9 ± 4.0 |

The results showed that when the amount of AOB was added in the range of 1-9 mg/kg in above simulated systems, there was a linear inhibition effect on acrylamide.

Example 3

The Inhibition Effect of Bamboo-Leaf-Extract on Acrylamide Formed by Frying Potato Chips (1) Potato Chips Fresh potatoes were washed, peeled off and cut into slices of approximately 1 mm thickness. Then, the cut potatoes slices were selected and rinsed with water twice before drying with tissue.

(2) Plant Extracts

Bamboo-leaf-extract: a product of Zhejiang University (Hangzhou) Leaf Bio-Technology Co., Ltd. (the product code is EOB-C01) which had a total flavonoid content of 40.7%, and a total phenol content of 79.8%.

Tea extract: a water soluble polyphenol preparation provided by Department of Tea Science, Zhejiang University (total content: 98%).

(3) Test Groups

This test consists of three groups, i.e., blank control group A (potatoes slices was not treated with any solutions), group B containing bamboo-leaf-extract (potato slices was soaked in bamboo-leaf-extract solution) and group C containing tea extract (potato slices was soaked in tea extract solution).

In order to prepare a 1 g/L aqueous solution of bamboo-leaf-extract, one gram bamboo-leaf-extract was added into 1 liter water, then potato slices were dipped in this solution for 1 min. The group was set as the group B (with bamboo-leaf-extract).

In order to prepare a 1 g/L aqueous solution of tea extract, one gram water soluble polyphenol preparation was add into 1 liter water, then potato slices were dipped into this solution for 1 min. The group was set as the group C (with tea extract).

The potato slices of the three groups were put into the microwave oven of 750 W, and heated at the middle-fire power to dryness, respectively. Group A was heated for 3.5 min, while group B and C were both heated for 5.5 min.

(4) Frying 50-60 g of dry potato slices in each of the groups A, B and C was fired in a fryer containing commercially available peanut oil at a temperature of between 140-160° C. for about 3 minutes to afford golden or brown potato chips. The potato chips were detected after they were picked up and the oil were removed. Fresh oil was used for each group.

(5) Sampling and Pretreatment

An appropriate amount of fried potatoes was milled in a mortar. 1.5 g sample was weighed and added to 500 μL the internal standard of $^{13}C_3$-acrylamide at 1 g/mL concentration. After standing for 10 min, the sample was degreased with 20 mL distilled petroleum ether twice, shaken well for 10 min, extracted by ultrasonic oscillation in 8 mL 2 mol/L NaCl solutions for 20 min twice, centrifuged for 15 min at 15,000 rpm, further extracted with 15 mL distilled ethyl acetate thrice. The extracts were combined, evaporated by a rotary evaporator, dried under $N_2$, redissolved in 1.5 mL distilled water, purified by 6 cc HLB chromatographic column and analyzed.

(6) Results

The content of acrylamide was measured by GC after the pretreatment of Potato Slices.

Figure 5:
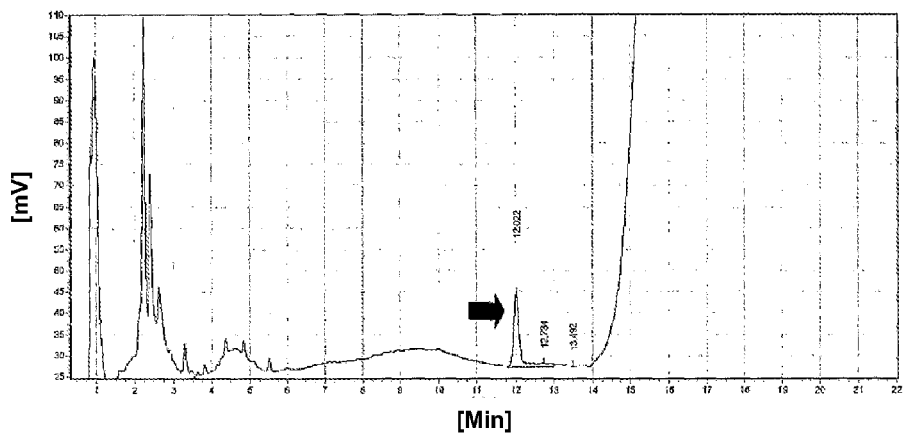
FIG. 5 shows the gas chromatogram of acrylamide generated after frying potato slices in Group A.
Figure 6:
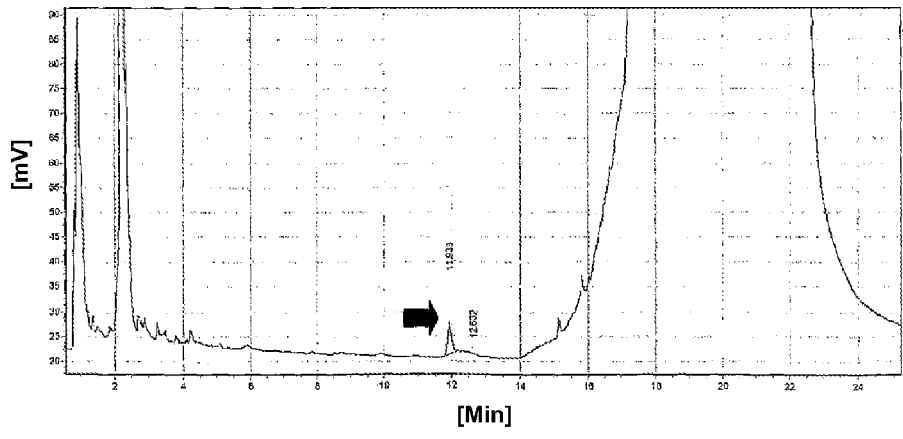
FIG. 6 shows the gas chromatogram of acrylamide generated after frying potato slices soaked by 1 g/L of aqueous solution of the bamboo leaf extract in Group B.
Figure 7:
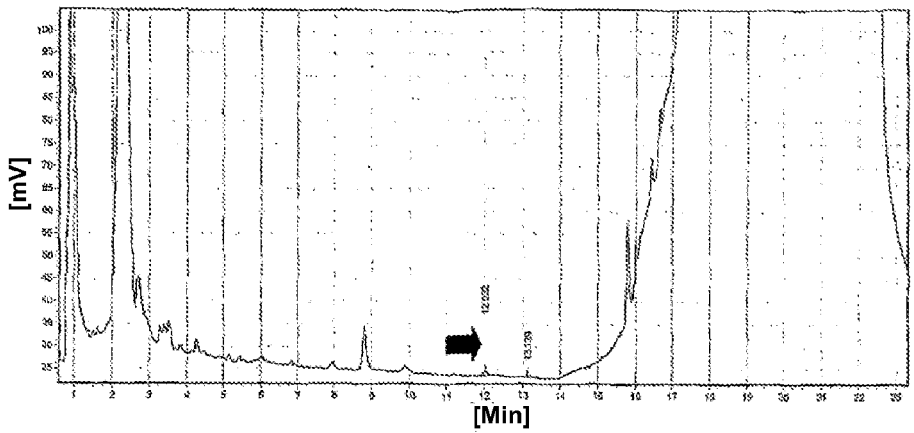
FIG. 7 shows the gas chromatogram of acrylamide generated after frying potato slices soaked by 1 g/L of aqueous solution of the tea extract in Group C.

FIG. 5 shows the gas chromatogram of acrylamide generated after frying potato slices in Group A. FIG. 6 shows the gas chromatogram of acrylamide generated after frying potato slices soaked by 1 g/L of aqueous solution of the bamboo leaf extract in Group B. FIG. 7 shows the gas chromatogram of acrylamide generated after frying potato slices soaked by 1 g/L of aqueous solution of the tea extract in Group C. It was determined by calculating the peak area that the inhibition rates of the bamboo-leaf-extract and tea extract on acrylamide formed by frying potato slices were 95.7% and 73.4%, respectively (as shown in Table 3).

TABLE 3

The inhibition rate of the bamboo-leaf-extract on acrylamide formed by frying potato slices (n = 6)

| Groups | Acrylamide content (µg/kg) | Inhibiting rate (%) |
| --- | --- | --- |
| Blank control (A) | 556.12 ± 84.35 | — |
| Bamboo-leaf extract test group (B) | 24.11 ± 2.46 | 95.7 ± 0.3 |
| Tea extract test group (C) | 147.85 ± 14.33 | 73.4 ± 2.8 |

As can be from Table 3, both bamboo-leaf-extract and tea extract have remarkable inhibition effects on acrylamide produced in fried potato chips. Furthermore, the inhibition effect of the bamboo-leaf-extract is better than the tea extract.

Example 4

The Inhibition Effect of Bamboo-Leaf-Extract on Acrylamide Formed by Frying Potato Chips The procedure was carried out in the same as Example 3 except that a test group of flavonoid glycosides compounds (rutin) was added, and the concentration of the bamboo-leaf-extract (AOB) soaking solution was increased to 5 g/L, that is, 5 grams AOB in 1 liter of water. The source of bamboo-leaf-extract was the same as Example 1. The source of tea extract was the same as Example 3. Rutin standard was purchased from Sigma co., with the purity ≧95%. The oil used was the same as the one in Example 3. The oil was controlled at a temperature of between 140-160° C. The sample pretreatment was conducted in the same method as Example 3, and the acrylamide content was measured by LC-MS/MS. It was determined by the internal standard method that the inhibition rates of the bamboo-leaf-extract, tea extract and lutin were 40.0%, 37.7% and 39.7%, respectively (as shown in table 4).

TABLE 4

The inhibition rate of AOB on acrylamide produced in fried potato chips (n = 6)

| Groups | Acrylamide content (µg/kg) | Inhibiting rate (%) |
| --- | --- | --- |
| Blank control (A) | 416.96 ± 44.38 | — |
| Bamboo-leaf-extract test group (B) | 250.21 ± 22.58 | 40.0 ± 1.3 |
| Tea extract test group (C) | 259.89 ± 56.92 | 37.7 ± 2.5 |
| Rutin test group (D) | 251.48 ± 43.82 | 39.7 ± 0.8 |

Table 4 shows that, all of the bamboo-leaf-extract, tea extract and rutin have a remarkable inhibiting effect on acrylamide produced in fried potato chips. But compared with example 3, the inhibiting effect is significantly decreased; this result shows that, there is not a simple linear relationship between inhibiting effect and dose. The inhibiting effect of flavonoids on acrylamide produced in fried potato chips does not increase with the dose, but there is an optimal range of dosage, and the dosage varies with the change of the food systems and processing conditions.

Example 5

The Inhibiting Effect of Various Doses of the Bamboo-Leaf-Extract on Acrylamide Formed by Frying Potato Chips The source of bamboo-leaf-extract (AOB) was the same as Example 1. In order to determine the inhibiting effect of various doses of the bamboo-leaf-extract on acrylamide formed by frying potato chips, 6 soaking solutions of 6 different AOB concentrations were prepared; The content of acrylamide in pretreated fried potatoes chips was measured by LC-MS/MS. The pretreatment was conducted in the same way as in Example 3.

TABLE 5

The inhibiting effect of various doses of bamboo-leaf-extracton acrylamide produced in fried potato chips (n = 6)

| Groups | AOB conc. of soaking liquid (g/L) | Acrylamide content (µg/kg) | Inhibiting rate (%) |
| --- | --- | --- | --- |
| Blank control | 0 | 587.10 ± 31.01 | |
| Group 1 | 0.002 | 502.46 ± 20.00 | 14.4 ± 2.3 |
| Group 2 | 0.01 | 235.43 ± 14.10 | 59.9 ± 8.6 |
| Group 3 | 0.1 | 118.34 ± 11.39 | 79.8 ± 6.6 |
| Group 4 | 1 | 36.12 ± 4.66 | 93.8 ± 2.0 |
| Group 5 | 2.5 | 203.16 ± 11.23 | 65.4 ± 7.1 |
| Group 6 | 4.9 | 360.98 ± 19.42 | 38.5 ± 3.2 |

Table 5 shows that, when the soaking solutions used for potato chips has an AOB concentration of between 0.002-4.9 g/L, the AOB exhibits a different degree of the inhibiting effect on acrylamide formed by frying potato chips. When the concentration is between 0.002-1 g/L, the inhibiting rate rises with the increase of concentration. However, when the concentration is between 1-4.9 g/L, the inhibiting rate decreases with the increase of concentration. All the above means that there is an optimal dosage range of bamboo-leaf-extract.

Example 6

The Inhibiting Effect of the Bamboo-Leaf-Extract on the Acrylamide Produced in Coffee Baking (1) Source of Raw Material Coffee beans was commercially available from the market, and the bamboo-leaf-extract (AOB) was the same as Example 1.

(2) The Test Groups

This test consists of two groups, i.e. the blank control group A (coffee beans were not soaked in any solutions), and group B with bamboo-leaf-extract (coffee beans were soaked in an AOB solution).

In order to prepare an aqueous solution of AOB with the concentration of 0.1 g/L, 0.1 grams AOB was added into one liter of water. The coffee beans were soaked in the solution for 1 min. The soaked coffee beans were used in group B.

(3) The Production of Coffee

The coffee beans from both group A and B were baked at a temperature of 190-200° C. The baked coffee beans were milled and extracted with hot water thoroughly, and the extraction are spray-dried to obtain coffee.

The acrylamide content of the coffee was measured by LC-MS/MS after the pretreatment which was the same as Example 3. It was determined by the internal standard method that, the inhibiting rate was 85.0% (as shown in Table 6).

TABLE 6

The inhibiting rate of AOB on the acrylamide produced in coffee baking (n = 6)

| Groups | Acrylamide content (μg/kg) | Inhibiting rate (%) |
|---|---|---|
| Blank control (A) | 241.45 ± 20.02 | — |
| Bamboo-leaf-extract test group (B) | 36.10 ± 3.30 | 85.0 ± 3.4 |

Table 6 shows that, the coffee beans soaked in the solution of AOB, have a significant inhibiting effect on acrylamide produced in coffee baking, and the inhibiting rate at this dose of AOB is close to the optimal action level.

Example 7

The Inhibiting Effect of the Bamboo-Leaf-Extract on Acrylamide Produced in Fried Chicken Wings Here, the bamboo-leaf-extract was the product of Zhejiang University (Hangzhou) Leaf Bio-Technology Co., Ltd., with the flavonoid content of 16.5% and the total phenol content 33.7%; the source of tea extract and rutin was the same as the one in Example 4; the source of oil was the same as the one in Example 3; Chicken wings were commercially available from the market.

(1) Test Groups

This test consisted of four groups, i.e. blank control group A (chicken wings without any samples in the coating), bamboo-leaf-extract group B, tea extract group C and rutin group D. 4.9 grams of each of the samples was added into 1 kilogram coating material and mixed into a slurry with water, and an egg was broken into the slurry. The slurry was then stirred homogeneously.

(2) Frying

The chicken wings were uniformly coated by the slurry of each of the groups, and fried immediately in the fryer at a temperature of 140-160° C. until the color of the chicken wings turned golden. Fresh oil was used for each group.

(3) Detection

The sample pretreatment was conducted in the same as Example 3. The content of acrylamide was measured by LC-MS/MS after pretreatment of sample.

(4) Results

Figure 9:
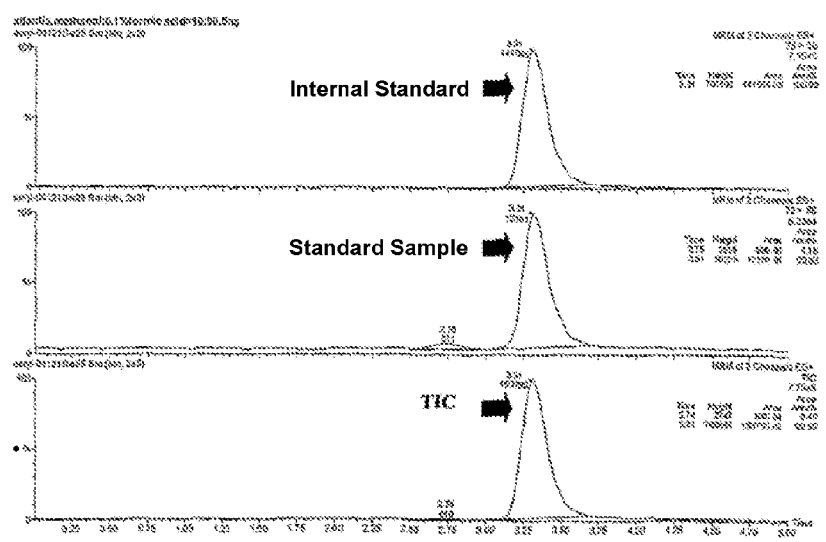
FIG. 9 shows the LC-MS/MS chromatogram of acrylamide generated after frying chicken wings covered by flour and original fried chicken spice (without any additives) in Group A.

FIG. 9 shows the LC-MS/MS chromatogram of acrylamide generated by frying the chicken wings in Group A (coated with the chicken spice containing no additives).

Figure 10:
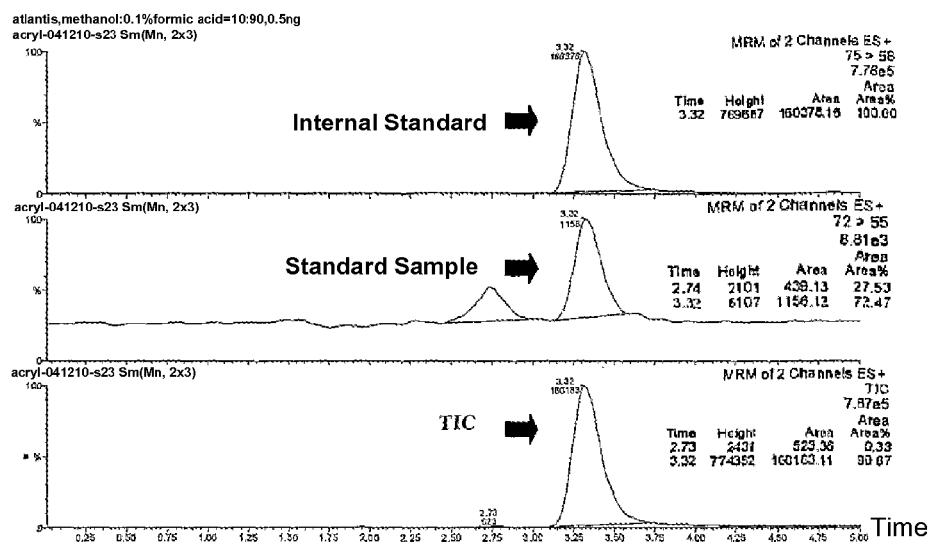
FIG. 10 shows the LC-MS/MS chromatogram of acrylamide generated after frying chicken wings covered by flour and original fried chicken spice (containing 4.9 g/kg of the bamboo leaf extract) in Group B.

FIG. 10 shows the LC-MS/MS chromatogram of acrylamide generated by frying the chicken wings in Group B (coated with the chicken spice containing 4.9 g/kg of the bamboo leaf extract).

Figure 11:
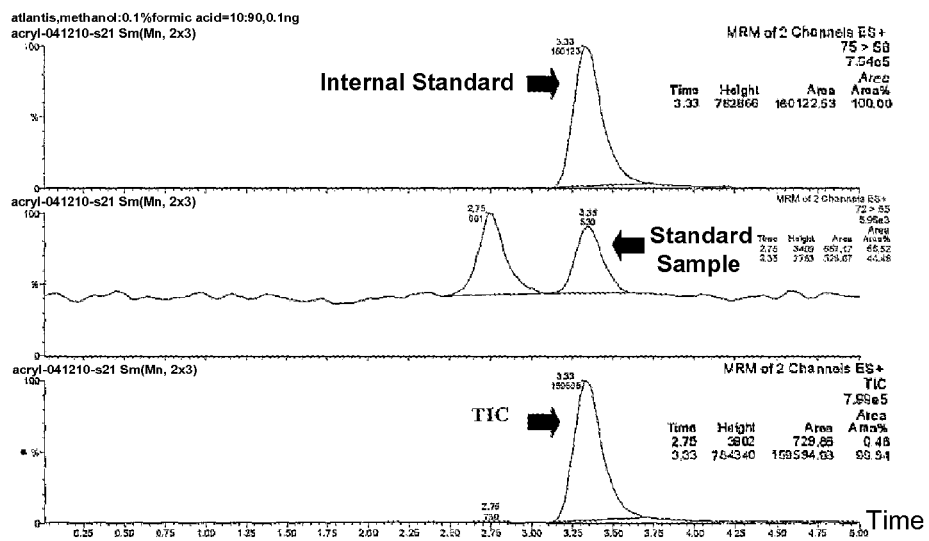
FIG. 11 shows the LC-MS/MS chromatogram of acrylamide generated from chicken wings covered by flour and original fried chicken spice (containing 4.9 g/kg of the tea extract) in Group C.

FIG. 11 shows the LC-MS/MS chromatogram of acrylamide generated by frying the chicken wings in Group C (coated with the chicken spice containing 4.9 g/kg of the tea extract).

Figure 12:
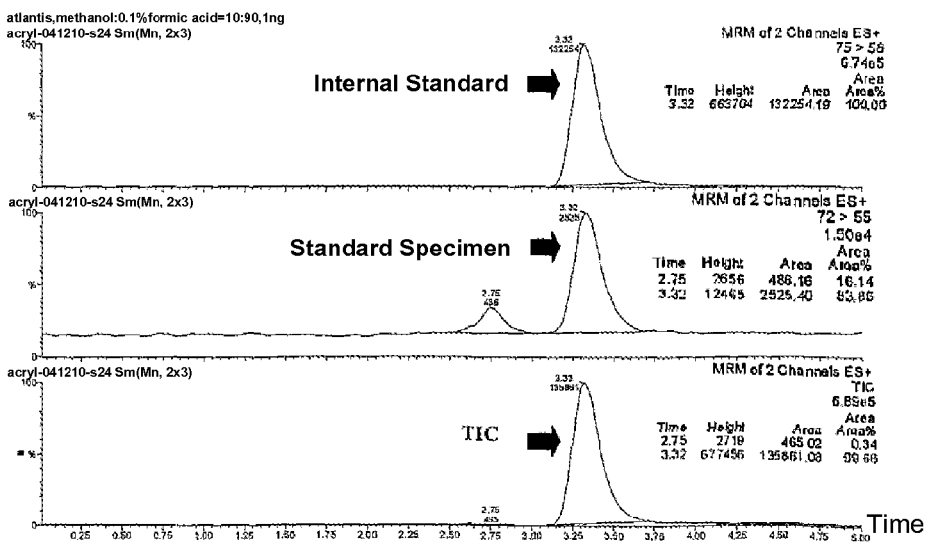
FIG. 12 shows the LC-MS/MS chromatogram of acrylamide generated after frying chicken wings covered by flour and original fried chicken spice (containing 4.9 g/kg of rutin) in Group D.

FIG. 12 shows the LC-MS/MS chromatogram of acrylamide generated by frying the chicken wings in Group D (coated with the chicken spice containing 4.9 g/kg of rutin).

It was determined by the internal standard method that, the inhibiting rates of the bamboo-leaf-extract, water soluble tea polyphenols and rutin on acrylamide produced in the fried chicken wings were 38.3%, 32.5% and 22.5%, respectively (as shown in Table 7).

TABLE 7

The inhibiting rates of the bamboo-leaf-extract on acrylamide produced in the fried chicken wings (n = 6)

| Groups | Acrylamide content (μg/kg) | Inhibiting rate (%) |
|---|---|---|
| Blank control (A) | 177.51 ± 13.06 | — |
| Bamboo-leaf-extract test group (B) | 109.50 ± 8.98 | 38.3 ± 0.3 |
| Tea extract test group (C) | 119.84 ± 11.39 | 32.5 ± 3.9 |
| Rutin test group (D) | 137.56 ± 9.09 | 22.5 ± 1.0 |

Table 7 shows that the bamboo-leaf-extract, tea extract and rutin have a remarkable inhibiting effect on acrylamide formation in fried chicken wings.

Example 8

The Inhibiting Effect of Various Doses of the Bamboo-Leaf-Extract on Acrylamide Formed in Fried Chicken Wings The source of bamboo-leaf-extract (AOB) was the same as Example 1. In order to determine the inhibiting effect of various doses of AOB on acrylamide formed in fried chicken wings, 6 groups of chicken wings with different doses of AOB were prepared in an actual frying system. The sample pretreatment was conducted in the same as Example 3. The content of acrylamide was measured by LC-MS/MS after pretreatment of sample.

TABLE 8

The inhibiting effect of various doses of AOB on acrylamide formed in fried chicken wings (n = 6)

| Groups | AOB dose (g/kg) | Acrylamide content (μg/kg) | Inhibiting rate (%) |
|---|---|---|---|
| Blank control | 0 | 194.50 ± 9.45 | — |
| Group 1 | 0.002 | 168.77 ± 6.12 | 13.2 ± 2.2 |

TABLE 8-continued

The inhibiting effect of various doses of AOB on acrylamide formed in fried chicken wings (n = 6)

| Groups | AOB dose (g/kg) | Acrylamide content (μg/kg) | Inhibiting rate (%) |
|---|---|---|---|
| Group 2 | 0.01 | 116.99 ± 1.20 | 39.8 ± 4.6 |
| Group 3 | 0.1 | 57.70 ± 5.04 | 70.3 ± 3.5 |
| Group 4 | 1 | 30.74 ± 3.08 | 84.2 ± 1.1 |
| Group 5 | 2.5 | 77.13 ± 3.33 | 60.3 ± 3.7 |
| Group 6 | 4.9 | 139.12 ± 10.30 | 28.5 ± 4.2 |

Table 8 shows, when 0.002-4.9 g/kg of AOB is added to the chicken wings, AOB in the coating material has a different inhibiting rate on the acrylamide produced in fried chicken wings. When 0.002-1 g/kg of AOB is added, the inhibiting rate rises with the increase of dose. However, the inhibiting rate decreases with the increase of dose, when 1-4.9 g/L of AOB is added. This shows that there is an optimal range of AOB dose.

Example 9

The Inhibiting Effect of the Bamboo-Leaf-Extract on the Acrylamide Produced in Deep-Fried Twisted Dough Sticks (a Typical Chinese Snack)

(1) Source of Raw Material

The source of bamboo-leaf-extract (AOB) was the same as Example 1 and the source and purity of tea extract and rutin were the same as Example 4.

(2) Test Groups

This test consisted of four groups, namely:
The blank control group A (flour without any processing);
Group B, with 2.5 g AOB in 1 kilogram of flour;
Group C, with 2.5 g tea extract in 1 kilogram of flour;
Group D, with 2.5 g rutin in 1 kilogram of flour.

An proper amount of soda and baking powder was added into the flour for preparing each of the groups, followed by some water. The flour was kneaded into dough The dough was allowed to stand for 12 h and kneaded once again, and then allowed to stand until frying.

(3) Frying

Each group of the fermented doughs were twisted into a rod, and cut into small pieces, before they were drawn into a strand and fried in a fryer. As soon as the color turned golden and the texture becomed fluffy, the deep-fried twisted dough sticks were took out of the fryer and the oil was allowed to drain off. The sample pretreatment was conducted in the same method as Example 3. The content of acrylamide was measured by LC-MS/MS after pretreatment of sample.

It was determined by the internal standard method that, the inhibiting rates of AOB, tea extract and rutin on acrylamide generated in the deep-fried twisted dough sticks were 67.5%, 64.9% and 53.7%, respectively (as shown in Table 9).

TABLE 9

The inhibiting rate of AOB on acrylamide generated in the deep-fried twisted dough sticks (n = 6)

| Groups | Acrylamide content (μg/kg) | Inhibiting rate (%) |
|---|---|---|
| Blank control (A) | 182.74 ± 15.06 | — |
| AOB test group (B) | 59.33 ± 6.29 | 67.5 ± 2.1 |
| Tea extract test group (C) | 64.07 ± 4.32 | 64.9 ± 3.6 |
| Rutin test group (D) | 84.56 ± 7.20 | 53.7 ± 3.9 |

Table 9 shows that, the AOB, tea polyphenols and rutin have an remarkable inhibiting effect on the acrylamide formed in the deep-fried twisted dough sticks.

Example 10

The Inhibiting Effect of Various Doses of the Bamboo-Leaf-Extract on Acrylamide Generated in the Deep-Fried Twisted Dough Sticks The source of bamboo-leaf-extract (AOB) was the same as Example 1. In order to determine the inhibiting effect of doses of AOB on acrylamide generated in the deep-fried twisted dough sticks, 6 groups of twisted dough sticks with different doses of AOB were prepared in actual frying system. The sample pretreatment was conducted in the same method as Example 3. The content of acrylamide was measured by LC-MS/MS after pretreatment of sample.

TABLE 10

The inhibiting effect of various doses of AOB on acrylamide in the deep-fried twisted dough sticks (n = 6)

| Groups | AOB dose (g/kg) | Acrylamide content (μg/kg) | Inhibiting rate (%) |
|---|---|---|---|
| Blank control | 0 | 201.23 ± 12.40 | — |
| Group 1 | 0.002 | 184.12 ± 10.23 | 8.5 ± 1.0 |
| Group 2 | 0.01 | 123.94 ± 8.66 | 38.4 ± 7.0 |
| Group 3 | 0.1 | 67.70 ± 4.86 | 66.4 ± 5.5 |
| Group 4 | 1 | 34.41 ± 2.98 | 82.9 ± 6.9 |
| Group 5 | 2.5 | 74.52 ± 9.44 | 63.0 ± 5.8 |
| Group 6 | 4.9 | 141.00 ± 11.01 | 29.9 ± 5.3 |

Table 10 shows, when 0.002-4.9 g/kg of AOB is added, AOB added in flour has a different degree of the inhibiting rate on the acrylamide in the deep-fried twisted dough sticks. When 0.002-1 g/kg of AOB is added, the inhibiting rate rises with the increase of dose. However, the inhibiting rate decreases with the increase of dose, when 1-4.9 g/L of AOB is added. This shows that there is an optimal range of AOB dose.

Example 11

The Inhibitory Effect of the Extract of Bamboo-Leaves on Acrylamide Generated by Burning of Cigarettes (1) Source of Sample Bamboo-leaf-extract: produced by Zhejiang University (Hangzhou) Leaf Bio-Technology Co., Ltd. (production code is EOB-S03), with the appearance of brown-yellow powder, 4.5% total flavonoids and 25.2% total solids content.

Tea extract: water-soluble preparation of tea polyphenols tea provided by the Tea Department of Zhejiang University, with the purity of 98%;

Rutin: standard preparation sold by Sigma, having the purity of 95%.

(2) Test Groups

This test consisted of four groups:
The blank control Group A was the cigarettes made of ordinary tobacco.

Test group B: a 4.9 g/L aqueous solution of the bamboo-leaf-extracts was prepared by adding one gram bamboo-leaf-extract into one liter water. Then this solution was sprayed onto the surface of tobacco homogeneously at the ratio of 10 mL/kg. These resulting cigarettes were referred to as the test Group B.

Test group C: a 4.9 g/L aqueous solution of tea extract was prepared by adding one gram tea extract into one liter water. Then this solution was sprayed onto the surface of tobacco homogeneously at the ratio of 10 mL/kg. These cigarettes were referred to as the test Group C.

Test group D: a 4.9 g/L aqueous solution of rutin was prepared by adding one gram rutin into one liter water. Then this solution was sprayed onto the surface of tobacco homogeneously at the ratio of 10 mL/kg. These cigarettes were referred to as the test Group D.

(3) Burning of Cigarette

The burning test of cigarettes was carried out by a smoking machine under the standard condition. And an air phase and a tar phase were collected respectively for the detection of acrylamide content. The pretreatment of the tar phase was the same method as Example 3. The content of acrylamide in the tar phase after pretreatment was measured with LC-MS/MS.

It was determined by calculating the peak area that, the inhibitory rates of bamboo-leaf-extract, tea extract and rutin on acrylamide generated by burning of cigarettes were 67.8%, 55.0% and 65.3%, respectively (as shown in Table 11).

TABLE 11

The inhibitory rate of the extract of bamboo-leaves on acrylamide generated by burning of cigarette (n = 6)

| Groups | Acrylamide content (μg/kg) | Inhibiting rate (%) |
|---|---|---|
| Blank control group (A) | 12343 ± 146 | — |
| AOB test group (B) | 3976 ± 36 | 67.8 ± 6.7 |
| Tea extract test group (C) | 5556 ± 62 | 55.0 ± 9.4 |
| Rutin test group (D) | 4287 ± 31 | 65.3 ± 4.4 |

As can be seen from the data in Table 11, the extract of bamboo-leaves, tea extract and rutin all have a remarkable inhibition effect on acrylamide generated during burning of tobacco.

Example 12

The Inhibitory Effect of Various Doses of the Extract of Bamboo-Leaves on Acrylamide from Burning of Tobacco The sources of the extracts were the same as Example 11. This test consisted of four groups:

The blank control Group A was the cigarette made of ordinary tobacco.

Test group D: a 10 g/L low-alcohol solution of extracts of bamboo-leaves was prepared by adding 10 gram bamboo-leaf-extract into one liter of low-alcohol solution (the low-alcohol solution in this experiment was the 20% ethanol solution in volume fraction). Then this solution was sprayed onto the surface of tobacco homogeneously at the ratio of 10 mL/kg. These resulting cigarettes were referred as to the test Group D.

Test group C: a 1 g/L low-alcohol solution of extracts of bamboo-leaves was prepared by adding 1 gram bamboo-leaf-extract into one liter of low-alcohol solution. Then this solution was sprayed onto the surface of tobacco homogeneously at the ratio of 10 mL/kg. These resulting cigarettes were referred to as the test Group C.

Test group B: a 0.1 g/L low-alcohol solution of extracts of bamboo-leaves was prepared by adding 0.1 gram bamboo-leaf-extract into one liter of low-alcohol solution. Then this solution was sprayed onto the surface of tobacco homogeneously at the ratio of 10 mL/kg. These resulting cigarettes were referred to as the test Group B.

Burning of Cigarettes

The burning test of cigarettes was carried out by a smoking machine under the standard condition. And an air phase and a tar phase were collected respectively for the detection of acrylamide content. The pretreatment of the tar phase was conducted in the same method as Example 3. The content of acrylamide in the tar phase after pretreatment was measured with LC-MS/MS.

The relative inhibition rates of the extract of bamboo-leaves were determined by calculating the peak area (as shown in Table 3).

TABLE 12

The inhibitory effect of various doses of the extract of bamboo-leaves on acrylamide from burning of tobacco (n = 6)

| Groups | The concentration of bamboo-leaf-extract (g/L) | Peak area of acrylamide | Relative Inhibiting rate (%) |
|---|---|---|---|
| A | 0 | 11645 ± 107 | — |
| B | 0.1 | 10204 ± 87 | 12.4 ± 2.3 |
| C | 1 | 6483 ± 32 | 44.3 ± 3.8 |
| D | 10 | 3367 ± 21 | 71.1 ± 4.1 |

As can be seen from the data in Table 12, when the concentration of the low-alcohol solution of bamboo-leaf-extract used in the burning test of cigarette carried out by a smoking machine under the standard condition is between 0.1-10 g/L and this solution is sprayed onto the surface of tobacco homogeneously at the ratio of 10 mL/kg, there is a different degree of the inhibitory effect on acrylamide produced in the tar phase during burning of the cigarettes. When the concentration of the low-alcohol solution is between 0.1-10 g/L, the inhibitory rate rises with the concentration's increase.

Example 13

The Inhibiting Effect of a Composite Comprising the Bamboo-Leaf-Extract on the Acrylamide Formed in the Simulated Reaction System A bamboo-leaf-extract, extract of rosemary and extract of licorice was mixed in a weight ratio of 3:1:1 to prepare a composite containing 60% by weight of bamboo-leaf-extract (AOB).

10 mL L-Asparagines (0.1 mol/L) and 10 mL D-glucose were added in a 100 mL conical flask and mixed. The mixture was set as a blank control group. The composite comprising the extract of bamboo-leaves was further added into the blank control group to afford Group 1 containing 10 mg/kg of the extract of bamboo-leaves, and Group 2 containing 150 mg/kg of the extract of bamboo-leaves, respectively. The blank control group, Group 1 and Group 2 were heated in a water bath at 120° C. respectively for 15 min for derivatization of the reaction solution→GC analysis.

The specific derivatization process was conducted as follows:

20 μL of each of the blank control group, groups 1 and 2 was added into 20 mL colorimetric tubes, followed by 0.6 mL 10% (v/v) H2SO4 and water up to 10 mL, The tubes were precooled in refrigerator at 4° C. for 20 min and 1.5 g KBr powder was dissolved in each group. Thereafter, 1 mL of 0.1 mol/L KBrO3 was added into each group, mixed thoroughly and derivatized in the refrigerator for 30 minutes. After taking out, 0.1 mL 1 mol/L Na2S2O3 was added into each group, mixed thoroughly and 5 mL distilled or HPLC-pure ethyl acetate was added for a complete extraction. The ethyl acetate phase was dried over anhydrous Na2SO4 and left for use.

The extract of bamboo-leaves was the antioxidant of bamboo leave produced by Zhejiang University (Hangzhou) Leaf Bio-Technology Co., Ltd. (the product code is AOB), which was a brown-yellow powder in appearance, of 32.5% total flavonoids and 56.7% total phenol. It contained four C-glycosides flavonoids: homo-orientin and orientin, isovitexin and vitexin in a ratio of 2.75:1.05:1.15:1 (by HPLC) [Yu Zhang et al., Determination of flavone C-glucosides in antioxidant of bamboo leaves (AOB) fortified foods by reversed-phase high-performance liquid chromatography with ultraviolet diode array detection, Journal of Chromatography A, 2005, 1065: 177-185]. Rosemary extract and licorice extract were commercially available from the market.

It was determined by calculating the peak area that, the amount of acrylamide produced in the blank control, Group 1 and Group 2 were 5421.12 µg/kg, 421.44 µg/kg and 148.40 µg/kg, and the inhibiting rates of the composite containing AOB on the acrylamide in the simulated reaction systems were 92.2% and 97.3%, respectively (as shown in Table 13).

TABLE 13

The inhibiting rates of the composite containing AOB on the acrylamide in the simulated reaction systems (n = 6)

| Groups | Dose of mixture (mg/kg) | Acrylamide content (µg/kg) | Inhibiting rate (%) |
|---|---|---|---|
| Blank control | 0 | 5421.12 ± 244.30 | — |
| Group 1 | 10 | 421.44 ± 11.00 | 92.2 ± 1.5 |
| Group 2 | 150 | 148.40 ± 9.78 | 97.3 ± 0.7 |

Table 13 shows that, the composite containing AOB has a remarkable inhibiting effect on the acrylamide in the simulated reaction systems.

Example 14

The Inhibitory Effect of a Composite Including Bamboo-Leaf-Extract on the Acrylamide from Fried Potato Slices A bamboo-leaf-extract and tea extract was mixed in a weight ratio of 19:1 to prepare a composite containing 95% by weight of bamboo-leaf-extract.
(1) Potato Slices
Fresh potatoes were cleaned, peeled off and cut into thin slices of approximately 1 mm. Then, the cut potato slices were selected and rinsed with water twice, before being dried by tissues.
(2) Plant Extracts
Extract of bamboo-leaves: the product of Zhejiang University (Hangzhou) Leaf Bio-Technology Co., Ltd. (the product code is AOB) with the total flavonoid content of 40.7%, and total phenol content of 79.8%.
Tea extract: water-soluble preparation of tea polyphenols provided by the Tea Department of Zhejiang University, with the purity of 98%;
(3) The Test Groups
This test consisted of eight groups:
The control group A (potato slices not treated by any solutions).
Group B: a 0.001 g/L aqueous solution of this composite was prepared by adding 0.001 gram of the composite in 1 liter water. The potato slices were then immersed in the aqueous solution of the extract of bamboo leaves for 1 min. The group was set as the group B.

In the same way as Group B, when the concentration of the solution is 0.01 g/L, the group was set as the group C; when the concentration of the solution is 0.1 g/L, the group was set as the group D; when the concentration of the solution was 0.5 g/L, the group was set as the group E; when the concentration of the solution was 1 g/L, the group was set as the group F; when the concentration of the solution was 2.5 g/L, the group was set as the group G; when the concentration of the solution was 4.9 g/L, the group was set as the group H.

The above groups were put into the microwave oven for homehold, and heated at the middle-fire power for drying.
Drying time: Group A 3.5 min, the other groups 5.5 min.
(4) Frying
50-60 g of the dried potato slices of each of the groups was fried in a pan containing peanut oil at a temperature of between 140-160° C. for about 3 minutes until the surface of potato slices turned golden or brownish. The potato slices were then taken out of the pan and the oil was allowed to drain off, so that the potato slices could be used to be detected. Fresh oil was used for each group.
(5) Sampling and Sample Pretreatment
An appropriate amount of the fried potato slices of each group was milled in a mortar. 1.5 g sample was weighed and 1 g/mL of internal standard was added. After standing for 10 min, the potato slices were degreased by 20 mL distilled petroleum ether twice, shaken for 10 min, extracted by 20 min ultrasonic oscillation with 8 mL 2 mol/L NaCl solution twice, centrifuged for 15 min at 15,000 rpm, further extracted with 15 mL distilled ethyl acetate three times. The extracts were combined, evaporated by a rotary evaporator, dried under N2, redissolved in 1.5 mL distilled water, purified by 6 cc HLB chromatographic column and analyzed.
(6) Results
The content of acrylamide was measured by LC-MS/MS after the pretreatment of Potato Slices.
The inhibitory rate of the composite including extract of bamboo-leaves on acrylamide from fried potato slices was determined by calculating the peak area (as shown in Table 14).

TABLE 14

The inhibitory rate of the composite including extract of bamboo-leaves on the acrylamide from fried potato slices (n = 6)

| Group | The weight concentration of the composite (g/L) | Acrylamide content (µg/kg) | Inhibiting rate (%) |
|---|---|---|---|
| A | 0 | 558.14 ± 76.50 | — |
| B | 0.001 | 456.33 ± 35.21 | 18.2 ± 3.5 |
| C | 0.01 | 380.12 ± 12.11 | 31.9 ± 4.1 |
| D | 0.1 | 316.41 ± 4.50 | 43.3 ± 1.8 |
| E | 0.5 | 222.40 ± 3.12 | 60.2 ± 0.8 |
| F | 1 | 162.99 ± 3.01 | 70.8 ± 1.2 |
| G | 2.5 | 381.70 ± 11.90 | 31.6 ± 2.0 |
| H | 4.9 | 441.23 ± 23.45 | 20.9 ± 0.4 |

As can be seen from the data in Table 14, when a soaking solution of the composite including bamboo-leaf-extract (EOB-S03) has a concentration of 0.001-4.9 g/L, the composite used for soaking the potato slices has a remarkable inhibition effect on the acrylamide produced in the fried potato slices. When the concentration is in the range of 0.001-1 g/L, the inhibitory rate rises with the increase of dose. However, the inhibitory rate decreases with the increase of dose, when the concentration is in the range of 1-4.9 g/L. This shows that there is an optimal range of concentration. So, the various concentrations of the composite including extract of bamboo-leaves have a different degree of the inhibition effect on acrylamide produced in the fried potato slices.

Example 15

The Inhibitory Effect of the Composite Including the Extract of Bamboo-Leaves on Acrylamide from Burning of Tobacco A bamboo-leaf-extract, *ginkgo biloba* extract and haw extract was mixed in a weight ratio is 1:1:1 to prepare a composite containing 34% by weight of bamboo-leaf-extract.
(1) The Source of Sample Extract of bamboo-leaves: produced by Zhejiang University (Hangzhou) Leaf Bio-Technology Co., Ltd. (production code is EOB-S03), with the appearance of brown-yellow powder, 4.5% total flavonoids and 25.2% total solids content. *Ginkgo biloba* extract and hawthorn extract were commercially available from the market. The low-alcohol solutions were used in this case which were 20% by volume of ethanol solutions.
(2) The Test Groups This test consisted of four groups:

A blank control group A was the cigarettes made of ordinary tobacco.

Group D: 10 g/L low-alcohol solution of the composite was prepared by adding 10 gram of the composite into one liter of low-alcohol. Then this solution was sprayed onto the surface of tobacco homogeneously at the ratio of 10 mL/kg. These resulting cigarettes were referred to as the test Group D.

Group C: 1 g/L low-alcohol solution of the composite was prepared by adding 1 gram of the composite into one liter of low-alcohol. Then this solution was sprayed onto the surface of tobacco homogeneously at the ratio of 10 mL/kg. These resulting cigarettes were referred to as the test Group C.

Group B: 0.1 g/L low-alcohol solution of the composite was prepared by adding 0.1 gram the composite into one liter of low-alcohol. Then this solution was sprayed onto the surface of tobacco homogeneously at the ratio of 10 mL/kg. These resulting cigarettes were referred to as the test Group B.
(3) Burning of Cigarettes The burning test of cigarettes was carried out by a smoking machine under the standard condition. And an air phase and a tar phase were collected for the detection of acrylamide content. The pretreatment of the tar phase was conducted in the same method as Example 2. The acrylamide in the tar phase after pretreatment was measured with LC-MS/MS. The inhibitory rate of the composite including extract of bamboo-leaves on acrylamide from the burning of tobacco was determined by calculating the peak area (as shown in Table 15).

TABLE 15

The inhibitory rate of the composite including extract of bamboo-leaves on acrylamide from the burning of tobacco (n = 6)

| Groups | The concentration of bamboo-leaf-extract (g/L) | Peak area of acrylamide | Inhibiting rate (%) |
|---|---|---|---|
| A | 0 | 13426 ± 347 | 0 |
| B | 0.1 | 12056 ± 153 | 10.2 ± 1.2 |
| C | 1 | 5491 ± 84 | 59.1 ± 3.9 |
| D | 10 | 4494 ± 42 | 66.5 ± 3.7 |

As can be seen from the data in Table 15, when the concentration of the low-alcohol solution of bamboo-leaf-extract (EOB-S03) used in the burning test of cigarette carried out by a smoking machine under the standard condition is between 0.1-10 g/L and this solution is sprayed onto the surface of tobacco homogeneously at the ratio of 10 mL/kg, there is a different degree of the inhibitory effect on acrylamide produced in the tar phase during burning of the cigarettes. When the concentration of the low-alcohol solution is between 0.1-10 g/L (the amount of the composite in the tobacco is in the range of 0.001-0.1 g/L), the inhibitory rate rises with the concentration's increase.

Example 16

The Inhibiting Effect of a Composite Containing AOB on Acrylamide in Fried Chicken Wings The bamboo-leaf-extract, apple polyphenol extract and onion extract was mixed in a weight ratio of 1.63:1:1 to prepare a composite containing 45% by weight of bamboo-leaf-extract.

Bamboo-leaf-extract was the antioxidant of bamboo leave produced by Zhejiang University (Hangzhou) Leaf Bio-technology Co. Ltd. (the product code is AOB), brown powder in appearance, of 32.5% total flavonoids and 56.7% total phenol. Both of apple polyphenol extract and onion extract were produced by the Laboratory of Institute of Natural Products in the college of Biological Engineering and Food Science, Zhejiang University. And they are dry powders extracted by 30% ethanol.

(1) Test Groups

This test consisted of eight groups:

The blank control group A: chicken wings were coated with the commercial available chicken spice.

Group B: the chicken wings were coated with the chicken spice containing 0.001 g/kg of the above mentioned composite of AOB, apple polyphenol and extract of onion.

Group C: the chicken wings were coated with the chicken spice containing 0.01 g/kg of the above mentioned composite.

Group D: the chicken wings were coated with the chicken spice containing 0.1 g/kg of the above mentioned composite.

Group E: the chicken wings were coated with the chicken spice containing 0.5 g/kg of the above mentioned composite.

Group F: the chicken wings were coated with the chicken spice containing 1 g/kg of the above mentioned composite.

Group G: the chicken wings were coated with the chicken spice containing 2.5 g/kg of the above mentioned composite.

Group H: the chicken wings were coated with the chicken spice containing 4.9 g/kg of the above mentioned composite.
(2) Frying Flour, egg and water were whipped into a paste, and the chicken wings were coated with the paste of each group, immediately fried in the fryer until the color of the chicken wings turned golden. Fresh oil was used for each group. The sample pretreatment was conducted in the same method as Example 2. The content of acrylamide was measured by LC-MS/MS after pretreatment of sample.

The inhibiting rate of the composite containing AOB on acrylamide produced in fried chicken wings was determined by the internal standard method.

TABLE 16

The inhibiting rate of the composite containing AOB on acrylamide produced in fried chicken wings (n = 6)

| Group | The amount of the composite per 1 kg of chicken spice (g/kg) | Acrylamide content (μg/kg) | Inhibiting rate (%) |
|---|---|---|---|
| A | 0 | 165.24 ± 11.98 | — |
| B | 0.001 | 140.60 ± 9.46 | 14.9 ± 1.8 |
| C | 0.01 | 101.23 ± 1.50 | 38.7 ± 5.9 |
| D | 0.1 | 79.40 ± 6.23 | 51.9 ± 3.5 |
| E | 0.5 | 47.93 ± 7.42 | 71.0 ± 4.1 |
| F | 1 | 43.44 ± 8.89 | 73.7 ± 2.6 |
| G | 2.5 | 68.10 ± 12.00 | 58.8 ± 3.0 |
| H | 4.9 | 115.80 ± 7.71 | 29.9 ± 2.4 |

As can be seen from the data in Table 16, when 0.001-4.9 g/kg of the composite containing AOB is used during frying chicken wings, the composite has a different degree of the inhibiting rate on the acrylamide produced in fried chicken wings. When 0.001-1 g/kg of the composite is added, the inhibiting rate rises with the increase of content. However, when 1-4.9 g/kg of the composite is added, the inhibiting rate decreases with the increase of the content. The optimal amount is in the range of 1-4.9 g/L.

Example 17

The Inhibiting Effect of the Composite Containing AOB on Acrylamide in the Deep-Fried Twisted Dough Sticks The bamboo-leaf-extract and the grape seed extract was mixed in a weight ratio of 3:1 to prepare a composite containing 75% by weight of bamboo-leaf-extract.

The source of bamboo-leaf-extract (AOB) was the same as Example 1. The extract of grape seeds was commercially available from the market.

Test Groups

This test consisted of eight groups:

A blank control group is flour without any treatment;

Group B, containing 0.001 g of the composite per 1 kilogram of flour; Group C, containing 0.01 g of the composite per 1 kilogram of flour; Group D, containing 0.1 g of the composite per 1 kilogram of flour; Group E, containing 0.5 g of the composite per 1 kilogram of flour; Group F, containing 1 g of the composite per 1 kilogram of flour; Group G, containing 2.5 g of the composite per 1 kilogram of flour; and Group H, containing 4.9 g of the composite per 1 kilogram of flour.

A proper amount of soda and baking powder was added into the flour of each of the eight groups, and kneaded into a dough with some water. The dough was allowed to stand for 12 h and kneaded once more, and was then allowed to stand until frying.

Frying

The fermented dough of each group was twisted into a rod, and cut into small pieces, before they were drawn into a strand, and then fried until the color turned golden and the texture becomed fluff. The deep-fried twisted dough sticks were taken out of the fryer, then the oil was allowed to drain off. The sample pretreatment conducted in the same method as Example 2. The content of acrylamide was measured by LC-MS/MS after pretreatment of sample.

The inhibiting rate of the composite containing AOB on acrylamide in the deep-fried twisted dough sticks was determined by the internal standard method. (as shown in table 17).

TABLE 17

The inhibiting rate of the composite containing AOB on acrylamide in the deep-fried twisted dough sticks (n = 6)

| Group | The amount of the composite per 1 kg of flour (g/kg) | Acrylamide content (μg/kg) | Inhibiting rate (%) |
|---|---|---|---|
| A | 0 | 222.80 ± 15.46 | — |
| B | 0.001 | 193.84 ± 9.67 | 13.0 ± 1.6 |
| C | 0.01 | 145.31 ± 7.12 | 34.8 ± 4.4 |
| D | 0.1 | 92.37 ± 5.50 | 58.5 ± 3.8 |
| E | 0.5 | 58.12 ± 2.40 | 73.9 ± 4.0 |
| F | 1 | 44.81 ± 5.72 | 79.9 ± 3.3 |
| G | 2.5 | 96.11 ± 1.32 | 56.9 ± 6.1 |
| H | 4.9 | 155.02 ± 6.12 | 30.4 ± 1.7 |

As can be seen from the data in Table 17, when 0.001-4.9 g/kg of the composite containing AOB is used during frying twisted dough sticks, the composite has a different degree of the inhibiting rate on the acrylamide produced in fried twisted dough sticks. When 0.001-1 g/kg of the composite is added, the inhibiting rate rises with the increase of content. However, when 1-4.9 g/kg of the composite is added, the inhibiting rate decreases with the increase of the content. This shows that there is an optimal range of the content. So, the composite containing bamboo-leaf-extract has a remarkable inhibition effect on acrylamide produced in the deep-fried twisted dough sticks.

Example 18

The Inhibiting Effect of the Composite Including AOB on Acrylamide in the Deep-Fried Twisted Dough Sticks A bamboo-leaf-extract was mixed with a ginkgo extract, a tea extract, a rosemary extract, an apple polyphenol extract, a haw extract, an onion extract, a licorice extract, a root of kudzuvine extract, a grape seed extract and a leech extract in a weight ratio of 30:1:1:1:1:1:1:1:1:1:1 to prepare a composite containing 75% by weight of bamboo-leaf-extract.

The source of bamboo-leaf-extract (AOB) was the same as Example 1. Tea extract was a water soluble polyphenol preparation provided by Department of Tea Science, Zhejiang University (total content: 98%). Both of the apple polyphenol extract and the onion extract were produced by the Laboratory of Institute of Natural Products in the college of Biological Engineering and Food Science, Zhejiang University. And they were all dry powders extracted by 30% ethanol. The ginkgo extract, rosemary extract, haw extract, licorice extract, root of kudzuvine extract, grape seed extract and leech extract were commercially available from the market.

Test Groups

This test consisted of eight groups:

A blank control group is flour without any treatment.

Group B, containing 0.001 g composite per 1 kilogram of flour; Group C, containing 0.01 g composite in 1 kilogram of flour; Group D, containing 0.1 g composite per 1 kilogram of flour; Group E, containing 0.5 g composite per 1 kilogram of flour; Group F, containing 1 g composite per 1 kilogram of flour; Group G, containing 2.5 g composite per 1 kilogram of flour; Group H, containing 4.9 g composite per 1 kilogram of flour.

A proper amount of soda and baking powder was added into the flour of each of the eight groups, and kneaded into a dough with some water. The dough was allowed to stand for 12 h and kneaded once more, and was then allowed to stand until frying.

(3) Frying

The fermented dough of each group was twisted into a rod, and cut into small pieces, before they were drawn into a strand, and then fried until the color turned golden and the texture becomed fluff. The deep-fried twisted dough sticks were taken out of the fryer, then the oil was allowed to drain off. The sample pretreatment conducted in the same method as Example 2. The content of acrylamide was measured by LC-MS/MS after pretreatment of sample. (as shown in Table 18).

TABLE 18

The inhibiting rate of the composite containing AOB on acrylamide in the deep-fried twisted dough sticks (n = 6)

| Groups | The amount of the composite in 1 kg of flour (g/kg) | Acrylamide content (µg/kg) | Inhibiting rate (%) |
|---|---|---|---|
| A | 0 | 222.80 ± 15.46 | — |
| B | 0.001 | 184.56 ± 11.02 | 17.2 ± 3.1 |
| C | 0.01 | 156.30 ± 6.45 | 29.8 ± 3.4 |
| D | 0.1 | 122.34 ± 10.11 | 45.1 ± 1.9 |
| E | 0.5 | 103.41 ± 7.50 | 53.6 ± 4.3 |
| F | 1 | 61.18 ± 2.12 | 72.5 ± 2.0 |
| G | 2.5 | 102.44 ± 9.40 | 54.0 ± 4.1 |
| H | 4.9 | 158.66 ± 8.44 | 28.8 ± 0.9 |

As can be seen from the data in Table 18, when 0.001-4.9 g/kg of the composite containing AOB is used during frying twisted dough sticks, the composite has a different degree of the inhibiting rate on the acrylamide produced in fried twisted dough sticks. When 0.001-1 g/kg of the composite is added, the inhibiting rate rises with the increase of content. However, when 1-4.9 g/kg of the composite is added, the inhibiting rate decreases with the increase of the content. This shows that there is an optimal range of the content. So, the composite containing bamboo-leaf-extract has a remarkable inhibition effect on acrylamide produced in the deep-fried twisted dough sticks.

All the literatures mentioned in the invention are cited in the application for reference, as every literature is cited separately as a reference. Furthermore, various modifications and alteration to this invention will become apparent to those skilled in the art without departing from the scope and spirit of this invention. It should also be understood that this invention is not intended to be unduly limited by the illustrative embodiments and examples set forth herein and that such examples and embodiments are presented by way of example only with the scope of the invention intended to be limited only by the claims as set forth herein as follows.

What is claimed is:

1. A method of inhibiting acrylamide generated during food heating process comprising: mixing a composition comprising a bamboo leaf extract comprising flavonoids and phenolic acids with food; wherein the total flavonoid content of bamboo leaf extract is 4-50% and the total phenolic acids content is 10-80%; wherein the flavonoids comprise homoorientin, orientin, isovitexin and vitexin, and the phenolic acids comprise chlorogenic acid, ferulic acid and caffeic acid.

2. The method of claim 1, wherein the composition contains 1-99% by weight of bamboo leaf extract; wherein the total flavonoid content of bamboo leaf extract is 4-50% and the total phenolic acids content is 10-80%.

3. The method of claim 1, wherein composition further comprises at least one extract selected from a group consisting of ginkgo extract, tea extract, rosemary extract, apple polyphenol extract, haw extract, onion extract, licorice extract, root of kudzuvine extract, grape seed extract and leech extract.

4. The method of claim 1 further comprising heating the food to a temperature of at least 120 degree C.

5. The method of claim 1, wherein the food is French fries, potato crisps, crisp cookies, biscuits, cakes, bread, cereal breakfast, fried bread sticks, clay oven rolls, snack noodles, hamburger, fried chickens, coffee or cocoa.

6. The method of claim 1, wherein the weight ratio between the composition and of the food is in the range of 0.001-5 g/kilogram.

7. The method of claim 1, wherein the weight ratio between the composition and of the food is in the range of 0.01-2 g/kilogram.

8. The method of claim 1, wherein the weight ratio between the composition and the food is in the range of 0.1-1 g/kilogram.

9. The method of claim 1, wherein the step of mixing the food with the composition is coating, soaking or spraying the food with the composition.

10. An acrylamide inhibitor composition for food heating processing comprising 1%-99% by weight of the bamboo leaf extract and 1%-99% by weight of at least one selected from a group consisting of ginkgo extract, rosemary extract, apple polyphenol extract, haw extract, onion extract, licorice extract, root of kudzuvine extract, grape seed extract and leech extract.

11. The method of claim 4, wherein the heating of the food is frying, baking, grilling, roasting, microwave heating, puffing or burning the food.

* * * * *